D. F. MORGAN.
TOY.
APPLICATION FILED MAY 21, 1920.
1,385,883.
Patented July 26, 1921.
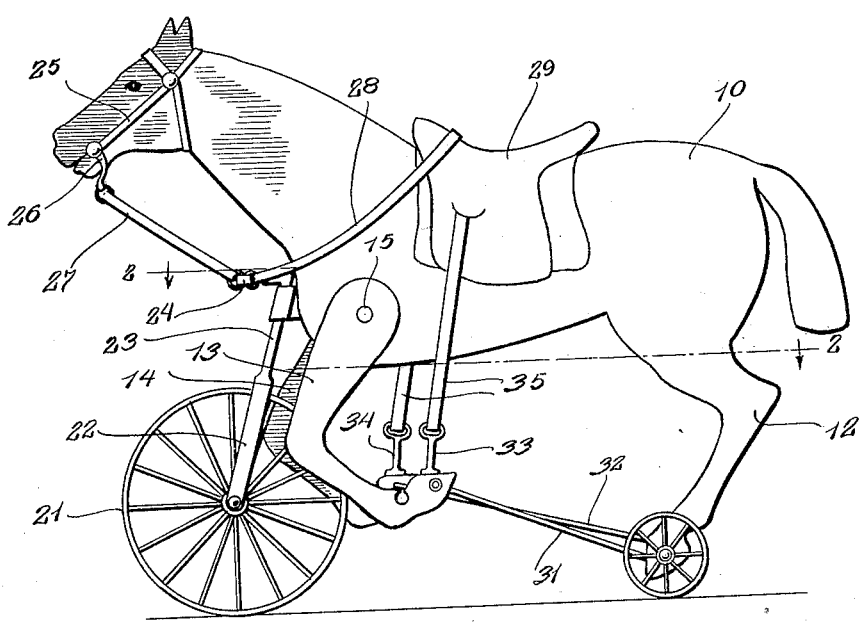
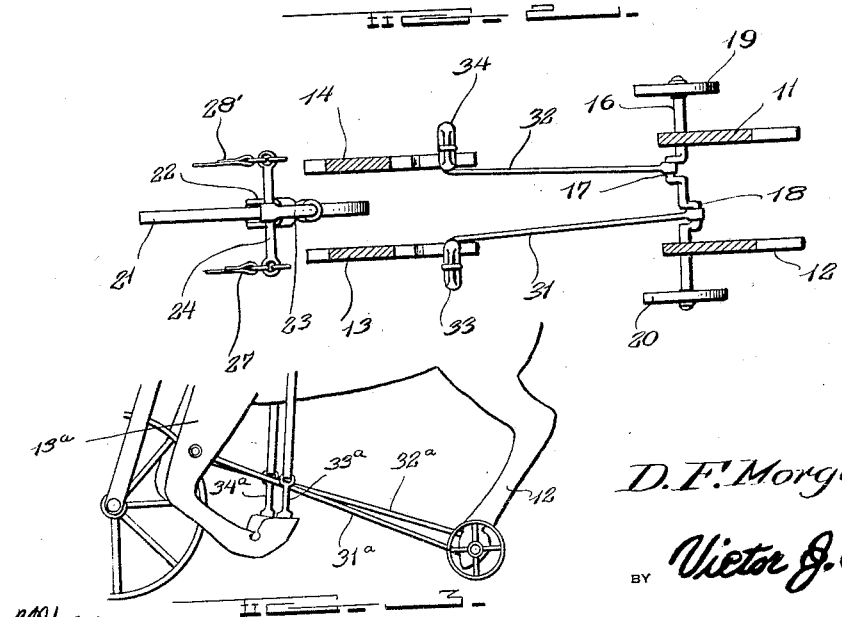

UNITED STATES PATENT OFFICE.

DAVID FLETCHER MORGAN, OF ATLANTA, GEORGIA.

TOY.

1,385,883.  Specification of Letters Patent.  Patented July 26, 1921.

Application filed May 21, 1920. Serial No. 383,152.

*To all whom it may concern:*

Be it known that I, DAVID F. MORGAN, a citizen of the United States, residing at Atlanta, in the county of Fulton and State of Georgia, have invented new and useful Improvements in Toys, of which the following is a specification.

This invention relates to toys, and the object is to provide a body portion which shall represent an animal such as a horse, with means for mounting the body portion on wheels, and means for mechanically imparting movement to the forelegs from a crank axle on which the hind legs are mounted.

A further object is to provide in connection with the representation of an animal, mechanical means for imparting movement to the forelegs when the toy is moved forwardly over the surface of the floor or the surface of the ground, and means for guiding the device, such guiding means being controlled by the rein.

With the foregoing and other objects in view, the invention consists in the novel construction, combination, and arrangement of elements hereinafter described and claimed.

In the drawings, Figure 1 is a view in side elevation. Fig. 2 is a section on line 2—2 of Fig. 1, and Fig. 3 is a detail view of a modification.

While I have shown in the drawings, the representation of a horse, it will be understood that the body portion 10 may be of any suitable configuration and may represent any animal desired. The hind legs 11 and 12 are permanently connected with the body portion, and the forelegs are pivotally connected with the body portion, the forelegs being shown at 13 and 14, and the pivotal connection at 15, The hind legs are supported on a crank axle 16, the crank element being shown at 17 and 18, and this axle is mounted or serves to mount wheels 19 and 20.

A forward wheel 21 constitutes a guiding element and is mounted in a fork 22, the upwardly extending portion of which is designated 23. Connected with the latter is a cross bar 24 by means of which control is effected.

The bridle is designated 25, the bit 26, and two elastic connecting devices 27 and 28' are secured to opposite ends of the bit and are connected with the cross bar. Also connected with the cross bar is a rein 28 which extends to the horn of the saddle 29, and this rein permits of the control of the cross bar, and therefore of the forward wheel.

The pivoted forelegs are each pivotally connected with a rod 31 or 32, and these rods are in turn connected with the crank shaft or crank axle. The forelegs are intended to assume a position approximating that of the legs of a horse in motion, and connected with the hoofs are the link members 33 and 34, these elements having connection with the ends of the elastic band 35 connected with the saddle. The element last named holds the forelegs in the position indicated, but permits of the movement thereof about the pivotal points, required to give the appearance of a horse in motion.

In Fig. 3 I have shown rods $31^a$ and $32^a$ connected with the forelegs $13^a$, above the knees. The link members $33^a$, $34^a$ are in a position corresponding with the usual position of the stirrups.

From the foregoing the operation will be readily understood and it will be apparent that the device may be manufactured at a reasonable expense and will be the source of considerable interest and amusement.

What I claim is:—

1. In a device of the class described, a body portion, legs permanently connected therewith, rotatable elements on which said legs are mounted, pivoted legs connected with the body portion, means for imparting movement to the pivoted legs when the device is moved forwardly over the surface of the ground, and a guiding device connected with said body portion, and resilient means for restoring the guiding device to normal position when operated.

2. In a device of the class described, a body portion, legs connected therewith, certain of said legs being pivoted, a saddle, elastic elements and link members for supporting said pivoted legs from the saddle, in a position denoting action and permitting of the movement of the legs about the pivotal point while supported, means for mounting the remaining legs connected with the body portion, said means including a crank axle, and means transmitting movement from the crank axle to the pivoted legs.

3. In a device of the class described, a body portion, legs connected therewith, certain of said legs being pivoted, wheels upon which said body portion is mounted, a crank axle mounting certain of the wheels, a fork member for mounting the remaining wheel, manual means and resilient means for controlling the fork member, and means for imparting movement from the crank axle to the pivoted legs.

4. In a device of the class described a body portion, legs connected therewith, certain of said legs being pivoted, elastic means for supporting the pivoted legs in a position denoting action, means for imparting movement to the pivoted legs when the device is moved over the surface of the ground, a guiding device including a fork, a wheel mounted therein, a cross bar connected with the fork, a rein connected with the cross bar, flexible elastic elements connected with the ends of the cross bar, and connected respectively with a stationary element, said elastic means normally returning the cross bar, the fork, and the wheel mounted therein, to a given position.

In testimony whereof I affix my signature.

DAVID FLETCHER MORGAN.